United States Patent
Yoon et al.

(10) Patent No.: US 9,057,942 B2
(45) Date of Patent: Jun. 16, 2015

(54) SINGLE CAMERA FOR STEREOSCOPIC 3-D CAPTURE

(75) Inventors: Youngshik Yoon, Valencia, CA (US); Izzat Izzat, Plainsboro, NJ (US)

(73) Assignee: THOMSON LICENSING, Boulogne-Billancourt (FR)

( * ) Notice: Subject to any disclaimer, the term of this patent is extended or adjusted under 35 U.S.C. 154(b) by 687 days.

(21) Appl. No.: 13/138,206

(22) PCT Filed: Jan. 29, 2009

(86) PCT No.: PCT/US2009/000573
§ 371 (c)(1),
(2), (4) Date: Jul. 20, 2011

(87) PCT Pub. No.: WO2010/087794
PCT Pub. Date: Aug. 5, 2010

(65) Prior Publication Data
US 2011/0273539 A1    Nov. 10, 2011

(51) Int. Cl.
| | |
|---|---|
| *H04N 13/02* | (2006.01) |
| *G03B 35/00* | (2006.01) |
| *H04N 13/00* | (2006.01) |
| *G03B 35/10* | (2006.01) |

(52) U.S. Cl.
CPC ............ *G03B 35/00* (2013.01); *H04N 13/0003* (2013.01); *H04N 13/0239* (2013.01); *G03B 35/10* (2013.01)

(58) Field of Classification Search
CPC . G03B 35/10; H04N 13/0003; H04N 13/0239
See application file for complete search history.

(56) References Cited

U.S. PATENT DOCUMENTS

| | | | |
|---|---|---|---|
| 3,849,643 A | 11/1974 | Takeda | |
| 3,990,087 A | 11/1976 | Marks et al. | |
| 4,178,090 A * | 12/1979 | Marks et al. | 396/331 |
| 4,419,041 A | 12/1983 | Rose | |
| 4,436,369 A | 3/1984 | Bukowski | |
| 5,493,427 A | 2/1996 | Nomura et al. | |
| 5,874,987 A | 2/1999 | Itoh | |
| 5,940,171 A | 8/1999 | Tocher | |
| 6,072,627 A | 6/2000 | Nomura et al. | |
| 6,320,705 B1 * | 11/2001 | Dube' | 359/796 |
| 6,643,396 B1 | 11/2003 | Hendriks et al. | |

(Continued)

FOREIGN PATENT DOCUMENTS

WO    WO2007121175    10/2007

OTHER PUBLICATIONS

Rao etal: "Digital Stereoscopic Imaging",SPIE Conf. on Stereoscopic Displays and Applns, San Jose, CA Jan. 1999, SPIE vol. 3639,pp. 144-154.

(Continued)

*Primary Examiner* — Joseph Ustaris
*Assistant Examiner* — Jill Sechser
(74) *Attorney, Agent, or Firm* — Robert D. Shedd; Richard LaPeruta

(57) ABSTRACT

A stereoscopic 3-D imaging apparatus has a camera and a wedged optical component attachable to the front of the camera. The wedged optical component is rotatable around the front of the camera using a rotating device, and the rotating device controls the rotation speed of the wedged optical component. The camera is capable of capturing stereoscopic 3-D images, resulting in lower costs and a simple capture process.

15 Claims, 5 Drawing Sheets

(56) References Cited

U.S. PATENT DOCUMENTS

| | | | |
|---|---|---|---|
| 6,721,500 B2* | 4/2004 | Perisic | 396/331 |
| 2001/0012053 A1 | 8/2001 | Nakamura | |
| 2002/0009299 A1* | 1/2002 | Lipton | 396/324 |
| 2008/0075451 A1* | 3/2008 | Jin | 396/327 |
| 2008/0151042 A1 | 6/2008 | Wang | |
| 2008/0158484 A1 | 7/2008 | Jung | |
| 2008/0284924 A1* | 11/2008 | Hofmann et al. | 349/5 |
| 2009/0153754 A1* | 6/2009 | Jung | 349/15 |

OTHER PUBLICATIONS

Goshtasby etal: "Design of a Single-Lens Stereo Camera System",2008 INIST CNRS, Pattern Recognition, vol. 26, No. 6, 1993, pp. 923-937.

Adelson etal: "Single Lens Stereo with a Plenoptic Camera", IEEE Transactions on Pattern Analysis and Machine Intell,vol. 14,No. 2,Feb. 1992,pp. 99-106.

Search Report Dated Apr. 9, 2009.

* cited by examiner

PHASE I

PHASE II

US 9,057,942 B2

SINGLE CAMERA FOR STEREOSCOPIC 3-D CAPTURE

This application claims the benefit, under 35 U.S.C. §365 of International Application PCT/US2009/000573, filed Jan. 29, 2009, which was published in accordance with PCT Article 21(2) on Aug. 5, 2010 in English.

FIELD OF THE INVENTION

The invention relates to a single camera for capturing 3-D images, in particular, the invention relates to a wedged and achromatized optical component used to change the field of view and allow a single camera to capture stereoscopic 3-D images.

BACKGROUND

Fundamentally, a camera captures images, either as a single image (photograph) or a sequence of images (video), by capturing the visible light ($\lambda$=400-700 nm) emitted by an object(s) on a recording medium.

Traditionally, cameras only took two-dimensional images (hereinafter referred to as "2-D"). However, cameras and camera techniques have been developed to capture three-dimensional images (hereinafter referred to as "3-D"). Stereoscopic imaging is one such technique. In stereoscopy, a 3-D image is recorded through a pair of 2-D images, capturing the same image, each being from a slightly different perspective. Each perspective acts to simulate the angle of vision from one of two human eyes. Scientifically, this phenomenon is known as binocular vision, enabling the human brain to interpret depth and object distance by combining two separate perceptions from eyes, one from the left eye and one from the right eye.

As shown in FIG. 1, the human field of view is composed of a view from each eye, where the view from each eye does not overlap 100%. Rather, each human eye gathers images from a unique perspective. As a result, the viewer can capture depth because of the two different views. Following that reasoning, the industry has long used two cameras to imitate human vision to deliver depth information.

Stereoscopic imaging is only possible because two images, from slightly different perspectives, are captured and presented either side-by-side, or overlaying the images. Conventionally, the industry has used two cameras, side-by-side, in order to simulate the human vision system of two eyes. As a result, those two cameras need to be aligned precisely. In particular, digital cameras for stereoscopic 3-D require higher precision due to pixel conversion. The cost of 3-D image capture is high because two cameras and precise alignment is expensive and exhaustive.

A problem exists with these systems, as they are higher cost in comparison with 2-D image capturing because of the additional camera and alignment issues. In particular, the precision for digital 3-D needs to be higher than film 3-D because of the pixel conversion reasons.

U.S. Pat. No. 6,320,705 discloses a method and apparatus for an adjustable wedge used to utilize the relative positioning of adjacently disposed convex and concave surfaces with equal spherical or cylindrical curvatures contacted together by a thin layer of lubricant. Although '705 provides an adjustable optical wedge that eliminates or minimizes distortions, aberrations and/or vignetting of transmitted light beams, the wedge is incapable of rotating in such a way as to facilitate stereoscopic imaging.

SUMMARY

It is an object of the invention to introduce a camera to capture stereoscopic 3-D images, resulting in lower costs and a simple capture process.

A stereoscopic 3-D imaging apparatus has a camera and a wedged optical component attachable to the front of the camera. The wedged optical component is rotatable around the front of the camera using a rotating device, and the rotating device controls the rotation speed of the wedged optical component.

Alternatively, a stereoscopic 3-D imaging apparatus has a camera having a lens and a liquid crystal device attachable to the camera in front of the lens. The apparatus can have electrical current input to the liquid crystal device to control refraction of light through the liquid crystal device to the lens, wherein the electrical current input provides for index shift of light passing therethrough. The liquid crystal device can also manipulate the viewing angle.

BRIEF DESCRIPTION OF THE DRAWINGS

The invention will be explained in greater detail in the following with reference to embodiments, referring to the appended drawings, in which.

DETAILED DESCRIPTION OF THE EMBODIMENTS

The invention will now be described in greater detail. Reference will now be made in detail to the embodiments of the present invention, which are illustrated in the accompanying drawings.

Figure 2:
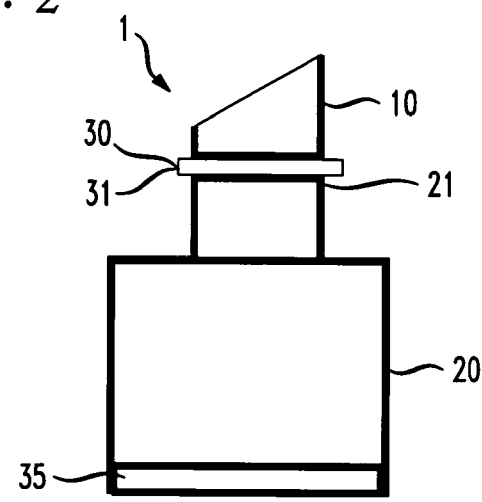
FIG. 2 is a front view of a stereoscopic 3-D imaging apparatus.

Referring now to FIG. 2, a stereoscopic 3-D imaging apparatus 1 according the present invention is illustrated. The stereoscopic 3-D imaging apparatus 1 has a single camera 20 and a wedged optical component 10 attachable to a leading end 21 of the camera. The wedged optical component 10 is rotatable around the leading end 21 of the camera using a rotating attachment device 30, capable of controlling the speed of rotation. Further, a recording component 35 is inside the camera, that receives light and forms an image, by either causing a chemical reaction on photographic film, or energizing a photocell (i.e. digital camera). The stereoscopic 3-D imaging apparatus 1, according to the invention, is unlike a standard stereoscopic camera (which is referred to here as standard stereoscopic camera S or camera S). The stereoscopic 3-D imaging apparatus 1 is unlike the camera S, because the stereoscopic 3-D imaging apparatus 1 only requires one camera 20 with an attachable optical wedge, capable of rotating at various speeds.

Figure 3A:
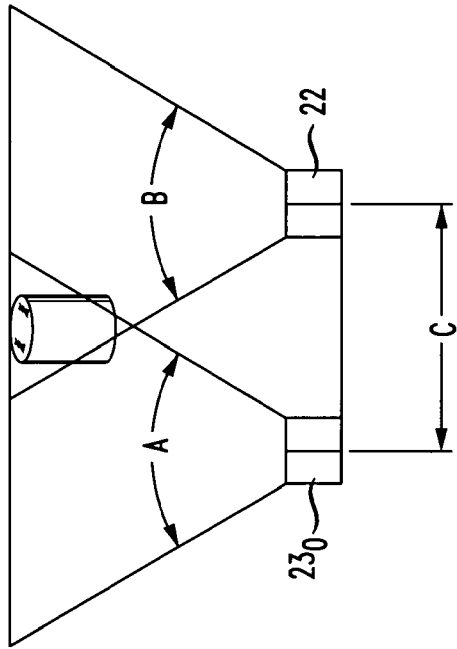
FIG. 3(a) is a perspective view representing the field of view and construction of human vision.
Figure 3B:
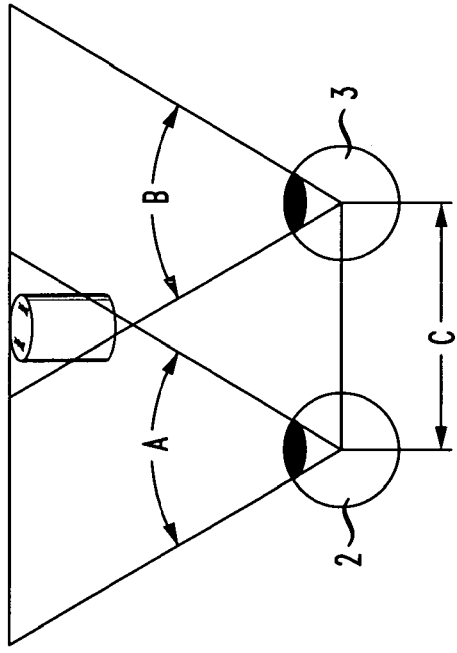
FIG. 3(b) is a perspective view representing the field of view and construction of a standard stereoscopic camera.

Standard stereoscopic cameras S, as illustrated in FIG. 3(b), use identical cameras 22, 23, constructed side-by-side, to simulate human binocular vision. Each camera captures a unique perspective in the same way that the human eye 2, 3 captures a unique perspective.

Figure 1:
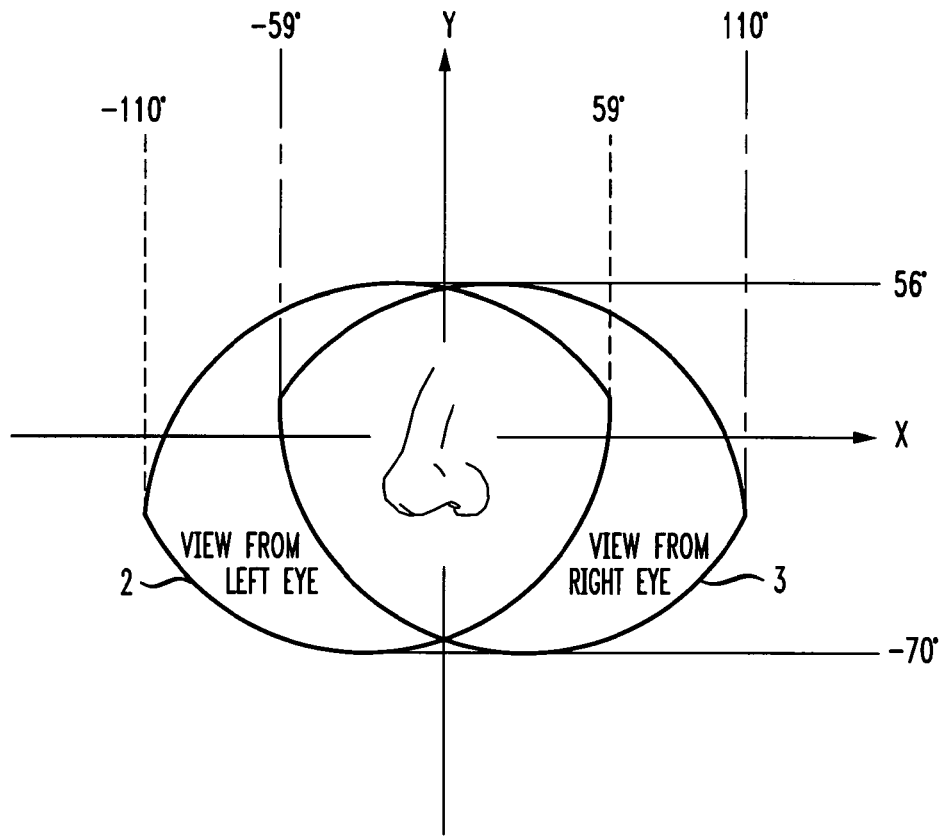
FIG. 1 is a diagram representing the field of view of both the left and right eyes, where the field of views have been overlain with respect to human binocular vision.

Each human eye 2, 3, as illustrated in FIGS. 1 and 3(a), captures a separate image, which is then sent to the human brain for processing. When the two images arrive simultaneously in the brain, the brain will overlap the images into one picture. Fundamentally, the human brain combines the two images, first matching up the similarities and then adding in small differences between the two images. Combining the small differences into one picture provides a perception of depth. Therefore, in order to understand stereoscopic 3-D imaging, it is also important to understand human vision system.

The human vision system has a physical configuration of two eyes 2, 3 that gather two separate images of different perception. Each perspective A, B overlap because of the eyes extended field of view.

As shown in FIG. 1, a human's standard field of view is determined by the placement of the eyes 2, 3. FIG. 1 shows a typical forward-facing field of view for a human that can extend to approximately +/−59° degrees toward the nose in each eye, −/+110° degrees away from the nose, and approximately 56° degrees above and −70° below a horizontal meridian (the plane extending along a latitudinal axis x of the eyes). It is evident from the drawing that the field of view extending toward the nose is limited because of the nose construction, creating a form of interference. Since the eyes 2, 3 are placed a distance C from each other, each field of view A, B fails to overlap 100% (as clearly illustrated in FIGS. 1 and 3(a)).

The distance, C, causes an object to be perceived differently in each field of view A, B, adding to the depth perception information the brain needs to derive an image having three dimensions.

As illustrated in FIG. 3(b), the standard stereoscopic camera S simulates the same technique utilized by human vision, using two cameras 22, 23, offset by a distance C, to simulate the binocular vision of two eyes.

According to the invention, the stereoscopic 3-D imaging apparatus 1 simulates the different perspectives gathered by the eyes 2, 3, by utilizing refraction of light by an optical wedge, rather than the use of two cameras offset by a distance C.

Figure 4:
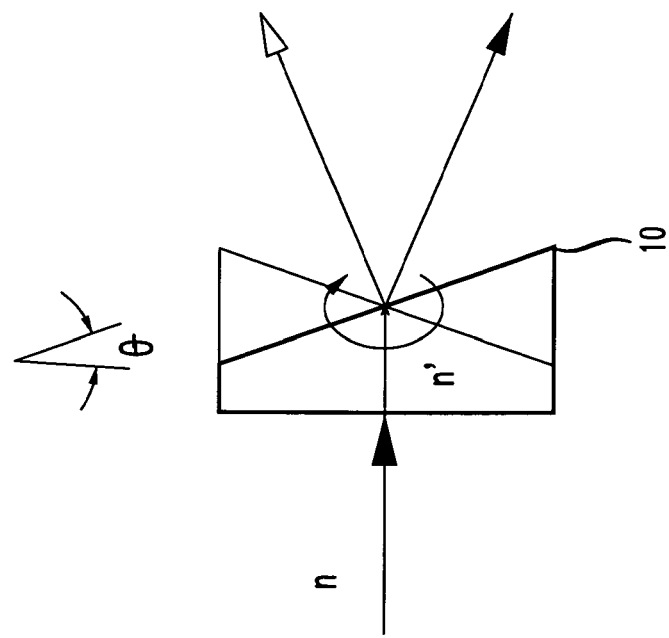
FIG. 4 is a demonstration on how light passes through the wedged optical component using Snell's Law.
Figure 4:
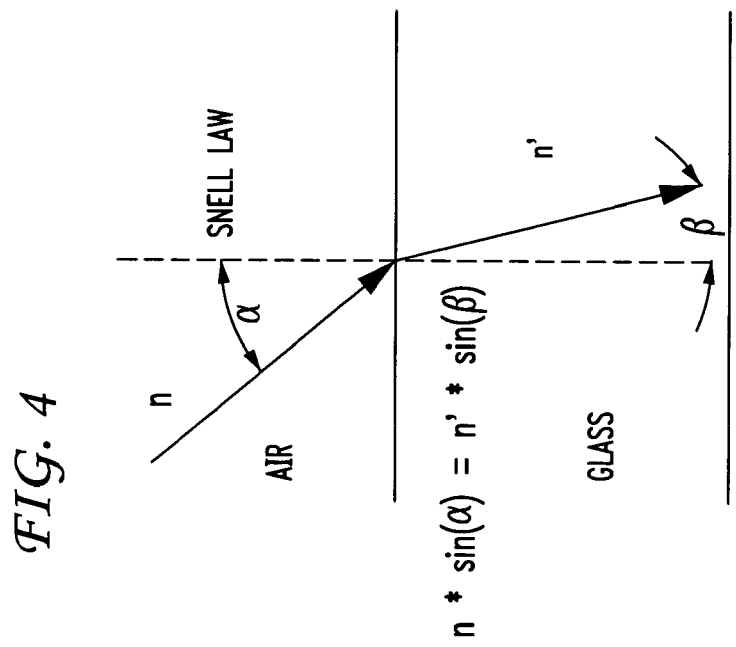

As illustrated in FIG. 4, refraction of light occurs when visible light travels from one medium into another, where the light rays may bend or change. Refraction occurs because there is a difference in the index of refraction between the two materials, such as air and glass. The effects of refraction allow a lens to focus a beam of light to a single point.

Willebrord Snell discovered that a beam of light n would bend as it enters a medium with a different refractive index. Snell's law, $n*\sin(\alpha)=n'*\sin(\beta)$, provides that there is a direct relationship between angles of incidence $\alpha$, $\beta$ and refraction, when light passes between two media (i.e. air, glass) with different indices of refraction n, n'. The amount of refraction depends on both the angle of incidence and the index of refraction of the material.

If light impacts a medium at any other angle, than a 90°, then the light will be bent or refracted, with the degree of refraction $\beta$ increasing as the beam is progressively inclined at a greater angle with respect to the medium. Therefore, the angle of incidence $\alpha$ is extremely important, as well as the refractive index n'. If the angle of the beam $\beta$ is increased even further, the light will refract with increasing proportion to the entry angle. Therefore, when light is passed through a wedged optical component 10, then the degree of refraction $\beta$ will change with regard to the inclination of the optical component 10, greatly affecting the angle of incidence $\alpha$.

FIG. 4 further illustrates on how light passes through a wedged optical component 10. As the wedge rotates, the exiting beam of light changes angle because of the refractive properties of the wedged optical component 10.

The angle $\theta$ of the wedged optical component works in combination with the refractive nature of the light beams. As a result, the angle $\theta$ of the wedge will depend on a distance between the camera and the observed object. As discussed above, the overlapping of a field of view produces the perception of depth. The overlapping really depends on the offset distance C, as seen in FIGS. 3(a) and 3(b). The distance C between the lenses is generally the same as the distance between humane eyes 2, 3, which is about 6.35 cm. However, it is known that some stereoscopic cameras utilize a greater distance between lenses in order to produce more impressive depth perception. The wedged angle $\theta$ will effectively work in a similar way. Depending on the inclination $\theta$ of the wedged optical component 10, the stereoscopic 3-D imaging apparatus 1 would be capable of creating greater or less depth perception.

Figure 3C:
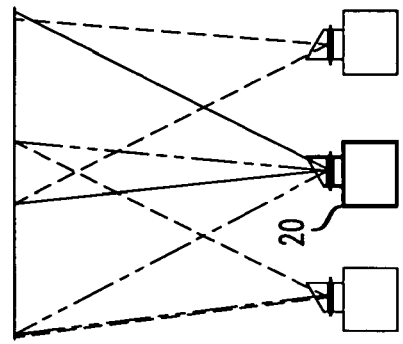
FIG. 3(c) is a perspective view representing the field of view and construction of the stereoscopic 3-D imaging apparatus, wherein a wedged optical component is rotating between two phases.

According to the invention, and clearly illustrated in FIG. 2, the wedged optical component 10 attaches to the leading end 21 of a single camera 20, through a rotating attachment device 30. As the wedged optical component 10 rotates, the stereoscopic 3-D imaging apparatus 1 captures different perspectives of a present object (as seen in FIGS. 3 and 6), thus simulating binocular vision of the human eyes 2, 3.

Figure 5:
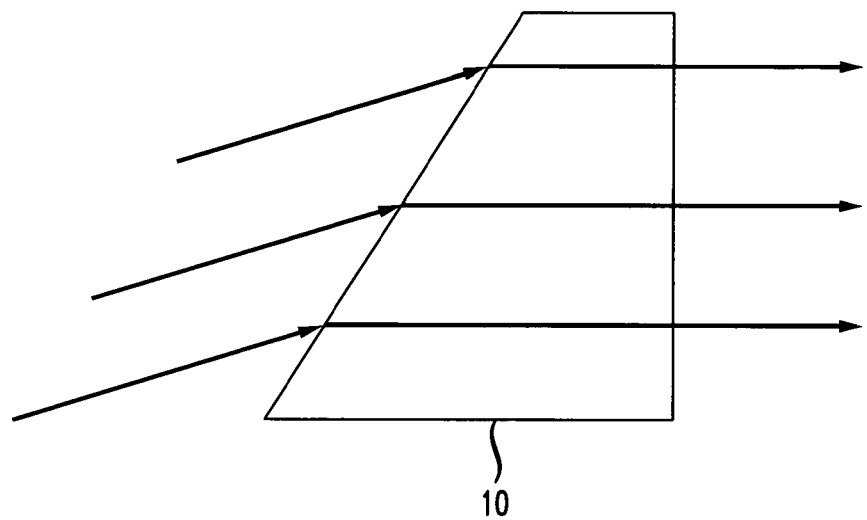
FIG. 5 is a side view of the wedged optical component, rendered achromatic.

In the embodiment shown, the wedged optical component 10 should be an achromatic optical lens, designed to limit the effects of any chromatic aberration. However, it is possible to use a wedged optical component that is not achromatized. FIG. 5 illustrates light passing through an achromatized optical wedge.

Visual perception requires that each eye 2, 3 capture two images nearly simultaneously, each image being from a slightly different perspective. Therefore, it is necessary that the stereoscopic 3-D imaging apparatus 1 operate in the same way. This would be done by introducing a phase control means 31 within the rotating device 30, which will signal when the wedged optical component 10 is in one of two phases, phase I or phase II.

FIG. 6 illustrates how the optical component 10 simulates views from a right eye (phase I) and a left eye (phase II). The optical component 10 rotates at speeds so that the camera is capable of capturing an image from phase I and phase II that are effectively simultaneous.

Figure 6A:
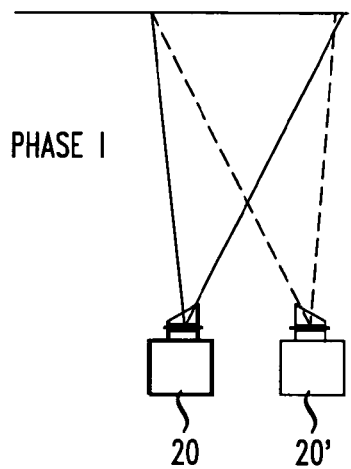
FIG. 6(a) is a front view of the stereoscopic 3-D imaging apparatus, where the wedged optical component is in phase I; loom
Figure 6B:
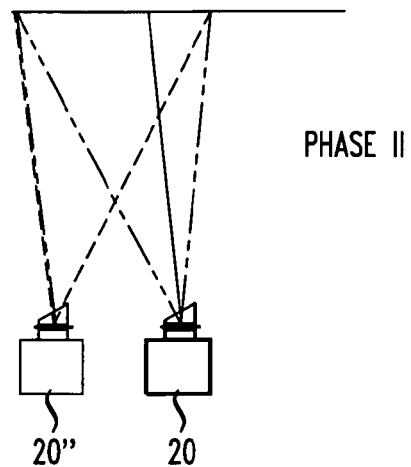
FIG. 6(b) is a front view of the stereoscopic 3-D imaging apparatus, where the wedged optical component is in phase II.
Figure 6C:
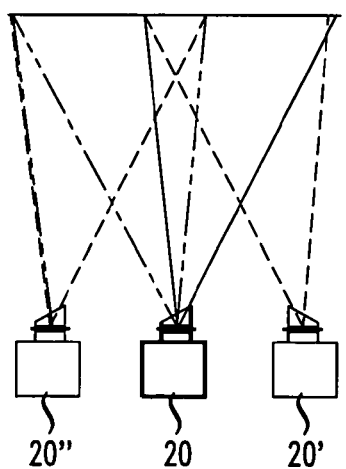
FIG. 6(c) is a front view of the stereoscopic 3-D imaging apparatus, showing the wedged optical component is both the phase I and phase II.
Figure 6D:
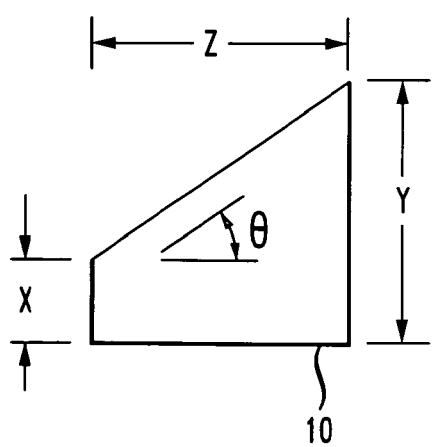
FIG. 6(d) is a front view of the wedged optical component.

Phase I, as illustrated in FIG. 6(a), represents an image capture as if the stereoscopic 3-D imaging apparatus 1 is located from a right side perspective (i.e. the right eye 2 or right camera 22 as shown in FIG. 3(a)). The right side camera perspective is denoted as 20' in FIG. 6(a) and FIG. 6(c). The wedged optical component 10 is in a position in FIG. 6(d) where the longest outer edge y is on the right side of the stereoscopic 3-D imaging apparatus 1 and the shortest outer edge x is on the left side of the stereoscopic 3-D imaging apparatus 1. Phase II, as illustrated in FIG. 6(*b*), represents an image capture as if the stereoscopic 3-D imaging apparatus 1 is located from a left side perspective (i.e. the left eye 3 and analogous to a right camera 23 position shown in FIG. 3(*a*)). To accomplish the phase II perspective, the optical component 10 is positioned so the shortest outer edge x is on the right side of the stereoscopic 3-D imaging apparatus 1 while the longest outer edge y is positioned on the left side of the stereoscopic 3-D imaging apparatus 1. The left side camera perspective is denoted as 20" in FIG. 6(*b*) and FIG. 6(*c*). The wedged optical component 10 dimensions are illustrated in FIG. 6(*c*), and depend upon the wedge angle θ needed to capture the observed images. Although the shorter outer edge x should be long enough to support proper construction with the rotating device 30.

Capturing the phase I and II images which is effectively simultaneous requires utilization of the rotating device 30, capable of operating at various speeds, but preferably at high speeds. It may not be necessary to rotate the optical lens at high speed in every application. In other embodiments of the invention, the optical component 10 may be rotated at varying speeds to position the wedged optical component 10 in phase I or phase II almost simultaneously.

In the preferred embodiment, a phase control means, which is part of the rotating devices, signals to the stereoscopic 3-D imaging apparatus 1 when the optical component 10 is either in phase I or phase II. As a result, the stereoscopic 3-D imaging apparatus 1 is synchronized to capture images when the wedged optical component 10 in phase I or phase II. However, the stereoscopic 3-D imaging apparatus 1 may be used to capture any variety of phases necessary for a desired application. In the embodiment shown, the phase control means transmits signals to a recording component 35, internal to the camera.

The stereoscopic 3-D imaging apparatus 1 captures each image phase either on film or through a suitable optical sensor. During playback of captured images, it is possible to have the human eye perceive viewing a single picture of a captured object, where two images, of two different perspectives (phase I, phase II), are overlain to produce a 3D image.

Utilizing a single camera in the stereoscopic 3-D imaging apparatus 1 results in lower costs and a more simplified image capture process. In the embodiment shown, the wedged optical component 10 and rotating device 30 are constructed with a new camera. However, it is possible to implement the wedged optical component 10 and rotating device 30 with an existing camera 20. In this embodiment, the rotating device 30 would include an attachment means 31 capable of attaching to different cameras. It is possible that the attachment means 31 could be a screw-on attachment, however, it is possible to use any attachment means 31 known to one skilled in the art. The wedged optical component 10 should be achromatized when attached to a user's existing camera. Therefore, the user need only implement the wedged optical component 10 in such circumstances, since the wedged optical component is capable of attaching to a user's existing camera.

In accordance with the present invention, the wedged optical component 10 may be replaced with a liquid crystal device having liquid crystal material with anisotropic properties, where the user can electronically control the orientation of liquid crystal. A liquid crystal device when appropriately dimensioned will behave as the wedged optical component 10 described above. Further, the liquid crystal device would provide freedom of index shift using electronic controls, and the viewing angle may be manipulated easily. Using a liquid crystal device, the user would have free range in both distance and viewing angle.

In accordance with the present invention, the wedged optical component 10 would include a range-finding focusing mechanism that would allow the user to measure the subject distance. Such a design would support crime scene re-construction, target distance estimation, etc.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A stereoscopic 3-D imaging apparatus comprising:
   a camera;
   a wedged optical component attachable to the front of the camera, the wedged optical component being rotatable and having a first face facing towards the front of the camera, two edges of different lengths connected to the first face, the two edges being disposed at right angles with respect to the first face, and an angled face with respect to the front of the camera, the angled face extending from respective ends of the two edges opposing the first face; and
   a rotating device controlling the rotation speed of the wedged optical component.

2. The apparatus of claim 1, wherein the wedged optical component is achromatized.

3. The apparatus of claim 1, wherein the rotating device signals phases of the wedged optical component.

4. The apparatus of claim 3, wherein signals are sent from a phase control to a recording component of the camera.

5. The apparatus of claim 4, wherein the recording component is a photo cell.

6. The apparatus of claim 4, wherein the recording component includes photographic film.

7. The apparatus of claim 1, wherein the rotating device is capable of rotating at high speeds.

8. The apparatus of claim 1, wherein the angle of the wedged optical component depends on the distance required between two positions.

9. The apparatus of claim 1, wherein the wedged optical component attaches to the camera by attachment through the rotating device.

10. The apparatus of claim 9, wherein the attachment is a screw-on attachment.

11. The apparatus of claim 1, wherein the optical component rotates at speeds capable of capturing an image from phase I and phase II.

12. The apparatus of claim 11, wherein the image capture of phase I and II is performed nearly simultaneously.

13. The apparatus of claim 1, synchronized to capture images when the wedged optical component 10 is in phase I or phase II.

14. The apparatus of claim 1, wherein the rotation speed is controlled to a desired rotation speed.

15. The apparatus of claim 1, wherein the wedged optical component directly receives ambient light unaided by other optical or reflective components.

* * * * *